(12) United States Patent  
Cooper et al.

(10) Patent No.: US 9,378,340 B2
(45) Date of Patent: Jun. 28, 2016

(54) METHODS AND SYSTEMS FOR UPGRADE AND SYNCHRONIZATION OF SECURELY INSTALLED APPLICATIONS ON A COMPUTING DEVICE

(71) Applicant: Apple Inc., Cupertino, CA (US)

(72) Inventors: Simon Cooper, Cupertino, CA (US); Dallas de Atley, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/495,554

(22) Filed: Sep. 24, 2014

(65) Prior Publication Data

US 2015/0082458 A1   Mar. 19, 2015

Related U.S. Application Data

(62) Division of application No. 12/757,009, filed on Apr. 8, 2010, now Pat. No. 8,849,717.

(60) Provisional application No. 61/224,417, filed on Jul. 9, 2009, provisional application No. 61/224,420, filed on Jul. 9, 2009.

(51) Int. Cl.

| | |
|---|---|
| *G06F 21/00* | (2013.01) |
| *G06F 21/12* | (2013.01) |
| *H04L 29/08* | (2006.01) |
| *H04L 29/06* | (2006.01) |
| *G06F 9/445* | (2006.01) |
| *G06F 9/44* | (2006.01) |

(52) U.S. Cl.
CPC *G06F 21/12* (2013.01); *G06F 8/65* (2013.01); *G06F 8/71* (2013.01); *H04L 29/0854* (2013.01); *H04L 63/123* (2013.01); *G06F 2221/2111* (2013.01); *G06F 2221/2145* (2013.01)

(58) Field of Classification Search
CPC .............. G06F 21/12; G06F 8/65; G06F 8/71; H04L 29/0854; H04L 63/123
See application file for complete search history.

(56) References Cited

U.S. PATENT DOCUMENTS

| | | | | |
|---|---|---|---|---|
| 7,904,608 | B2 * | 3/2011 | Price | G06F 8/65 710/10 |
| 2002/0174372 | A1 * | 11/2002 | Venkataraman | H04L 69/329 713/400 |
| 2008/0168184 | A1 * | 7/2008 | Freedman | H04L 67/1095 709/248 |
| 2009/0037452 | A1 * | 2/2009 | Baitalmal | G06F 17/30575 |
| 2009/0193149 | A1 * | 7/2009 | Khosravy | G06F 17/30174 709/248 |
| 2009/0259493 | A1 * | 10/2009 | Vernon | G06F 19/322 705/3 |
| 2010/0241763 | A1 * | 9/2010 | Chan | H04L 67/2857 709/248 |
| 2011/0314462 | A1 * | 12/2011 | Clark | G06F 8/65 717/169 |
| 2014/0157387 | A1 * | 6/2014 | Lee | G06F 17/30309 726/7 |

* cited by examiner

*Primary Examiner* — Calvin Cheung
(74) *Attorney, Agent, or Firm* — Downey Brand LLP

(57) ABSTRACT

Embodiments of the present disclosure provide for upgrades and synchronization of applications installed on a device, such as a mobile device. In one embodiment, a device may include applications purchased and downloaded via a content management system. The device maintains a list or database of applications that are authorized for each device. This list is also replicated in a remote cache that is maintained by an archive host. The device may then synchronize and upgrade these applications across multiple platforms, such as one or more computers that can be coupled to the device or the archive host. The archive host allows for files of the application be provided back to the device. Upon installation, the device can then confirm the authorization and identity of the newly installed application.

20 Claims, 7 Drawing Sheets

METHODS AND SYSTEMS FOR UPGRADE AND SYNCHRONIZATION OF SECURELY INSTALLED APPLICATIONS ON A COMPUTING DEVICE

CROSS-REFERENCE TO RELATED APPLICATIONS

This application is a divisional of U.S. application Ser. No. 12/757,009, filed Apr. 8, 2010, now U.S. Pat. No. 8,849,717, entitled "Methods and Systems for Upgrade and Synchronization of Securely Installed Applications on a Computing Device," which claims the benefit of U.S. Provisional Application No. 61/224,417, filed Jul. 9, 2009, entitled "Methods and Systems for Archiving and Restoring Securely Installed Applications on a Computing Device," and U.S. Provisional Application No. 61/224,420, filed Jul. 9, 2009, entitled "Methods and Systems for Upgrade and Synchronization of Securely Installed Applications on a Computing Device", the contents of which are incorporated herein by reference in their entirety for all purposes.

FIELD

This application relates to the installation of software on a computing device. More particularly, the application relates to the secure installation of software.

BACKGROUND

Computing devices, especially mobile devices, have advanced dramatically and now commonly allow for the installation of new applications to extend the functionality of the device. However, this openness and variety of available applications brings security risks and management issues, such as the risk of malware, as has been seen in the world of personal computers. These risks can be especially important to enterprises that allow its employees or users to use their mobile computing devices for business or work purposes.

To deal with these risks, many mobile device platforms have introduced various security architectures. Typically, in these security architectures, the mobile device platform is protected based on granting privileges to software, usually based on code signing. The access control decision to assign privileges to software processes is based either on code signing or on explicit user approval, or a combination thereof.

Unfortunately, these security features and the large number of applications can make it difficult for a user or enterprise to maintain their mobile computing device in proper working order. For example, if a certain piece of software becomes obsolete or has been upgraded, it can be difficult to efficiently distribute the upgrade. Designing the user interaction for upgrade or synchronization of applications without hampering usability and security can be tedious. Accordingly, it may be desirable to provide methods and systems that allow for the easy management and upgrade of securely installed software.

BRIEF DESCRIPTION OF THE DRAWINGS

A better understanding of the present invention can be obtained from the following detailed description in conjunction with the following drawings, in which.

DETAILED DESCRIPTION

Figure 1:
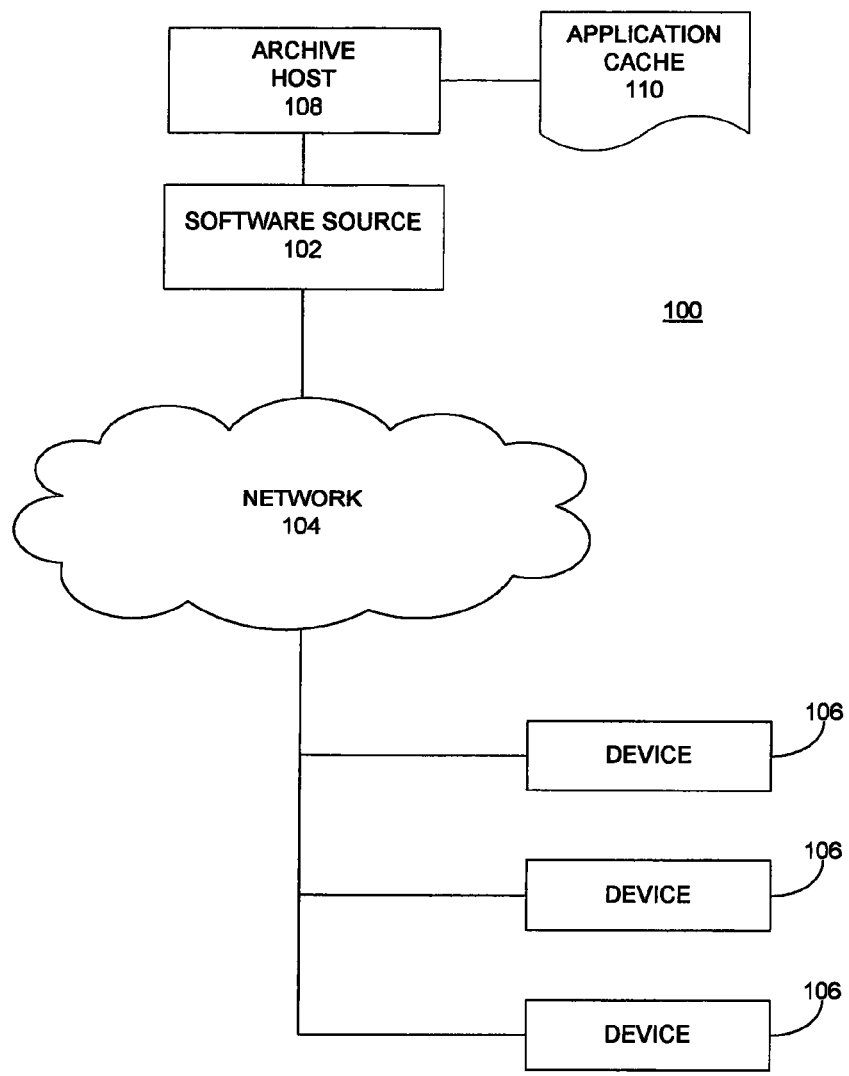
FIG. 1 is an example of an environment suitable for practicing various embodiments described herein.

Embodiments of the present disclosure provide for upgrades and synchronization of applications installed on a device, such as a mobile device. In one embodiment, a device may include applications purchased and downloaded via a content management system. The device maintains a list or database of applications that are authorized for each device. This list is also replicated in a remote cache that is maintained by an archive host.

The device may then synchronize and upgrade these applications across multiple platforms, such as one or more computers that can be coupled to the device or the archive host. The archive host can provide a package of files that may include the code or other data back to the device. The device may then confirm the authorization and identity of the newly installed application.

Alternatively, when applications have been upgraded, the device may update the list maintained by the device and/or the archive host may update the remote application cache. Applications across multiple devices may be efficiently upgraded as a consequence. Accordingly, the various embodiments allow applications to be installable multiple times, while maintaining the security of the installation.

In some embodiments, in order to perform upgrades and synchronization securely, the device may partition its application storage into a plurality of partitions. The multiple partitions allow the device to isolate the different versions of the application files and, if needed, swap between versions of an application. Furthermore, using partitions and dynamic containers, software applications can be maintained very simply by relying on installation and uninstallation rather than more complex logic.

When installing an application in a partition, an installer configures one or more secure containers for the software and installs the software exclusively in these containers. In some embodiments, the installer randomly determines the identifiers for the containers. These identifiers remain unknown to the software to be installed. Thus, an installation framework maintains the correspondence between an application, its partitions, and its container.

For example, each software application may have a unique identifier. This unique identifier may be included in the installation request or also determined by the installer. The installer then determines a randomly assigned identifier, such as a directory name, for one or more containers on the device in which the application will be installed. The containers may be a specific area of storage in a partition on the device or a directory defined on the device. Data specific to the software application including code storage, documents, preferences, and other libraries are stored and restricted to these dynamic containers.

After installation, an installation framework performs a bind process to correlate the randomly assigned identifier with the unique identifier of the application. The installation framework also manages the execution of the application. For example, when the application is launched, the installation framework performs a search for that application's randomly assigned identifier and locates the application's container.

The application is then allowed to execute within its container. During execution, the software application may also be restricted in various ways by the installation framework to its dynamic containers. The installer may also work with a trusted operating system component, such as the kernel, to help enforce the container restrictions.

As noted, the installer may use randomly assigned identifiers for the containers, which are unknown to the software being installed. The random identifiers may be based on various functions, such as a hash function and the like. In addition, the random identifiers for the containers may be based on various unique attributes of the software. In some embodiments, the installer stores this information only in a trusted cache for access by the installation framework.

Moreover, if desired, the use of random identifiers for containers may be used in conjunction with other security mechanisms. For example, the operating system of the computing device may be configured to determine whether the code has been authorized by a trusted authority.

For example, a trusted authority may authorize software for installation and/or execution by digitally signing the software. As is known in the art, a digital signature uses public key cryptography to ensure the integrity of data. If the code is authorized and verified as such, it may be generally executed without any further system or user interaction; if the code is not authorized, its ability to be executed on the computing device may be restricted or even prevented.

Figure 2A:
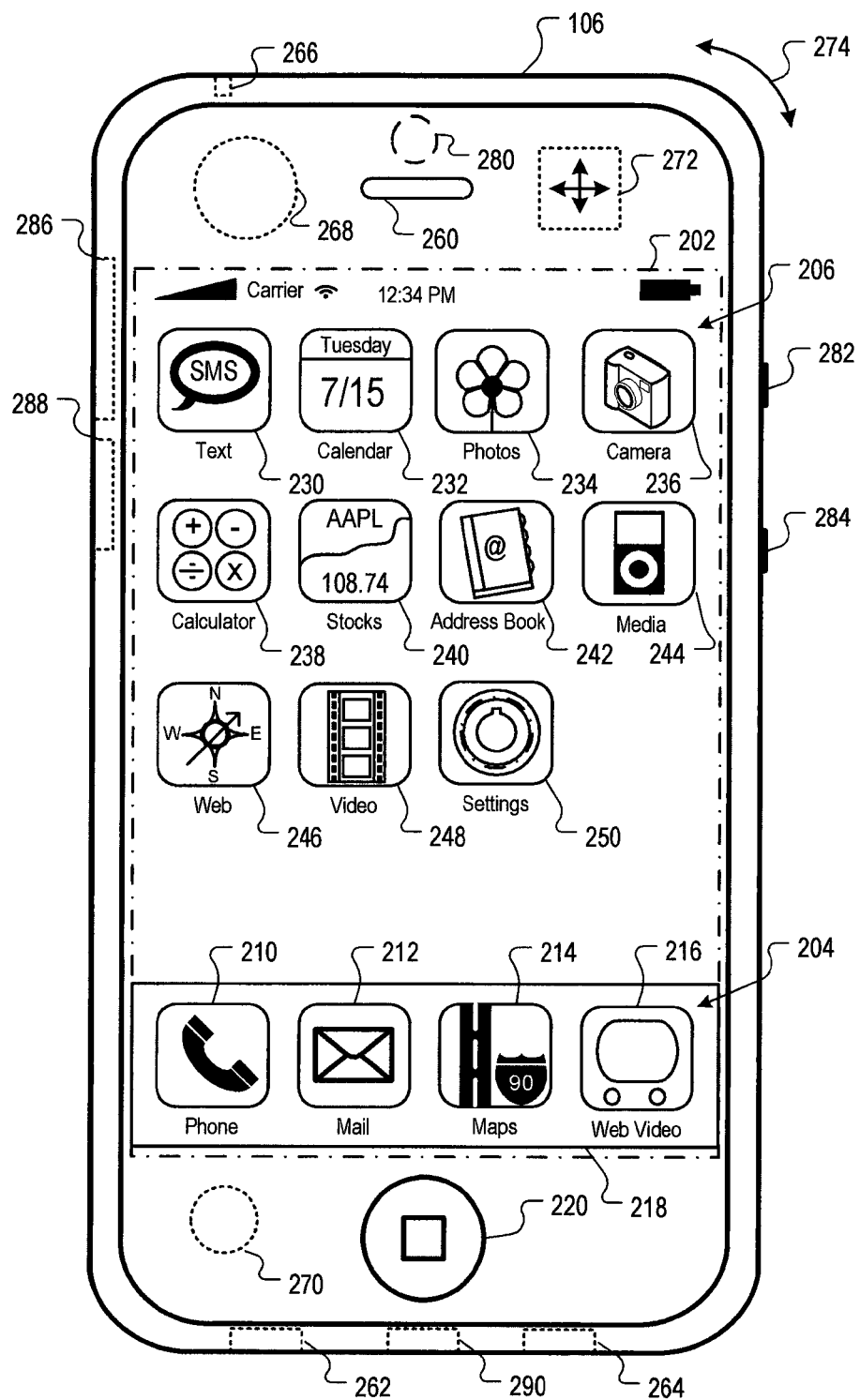
FIGS. 2A and 2B illustrate an exemplary mobile device.
Figure 2B:
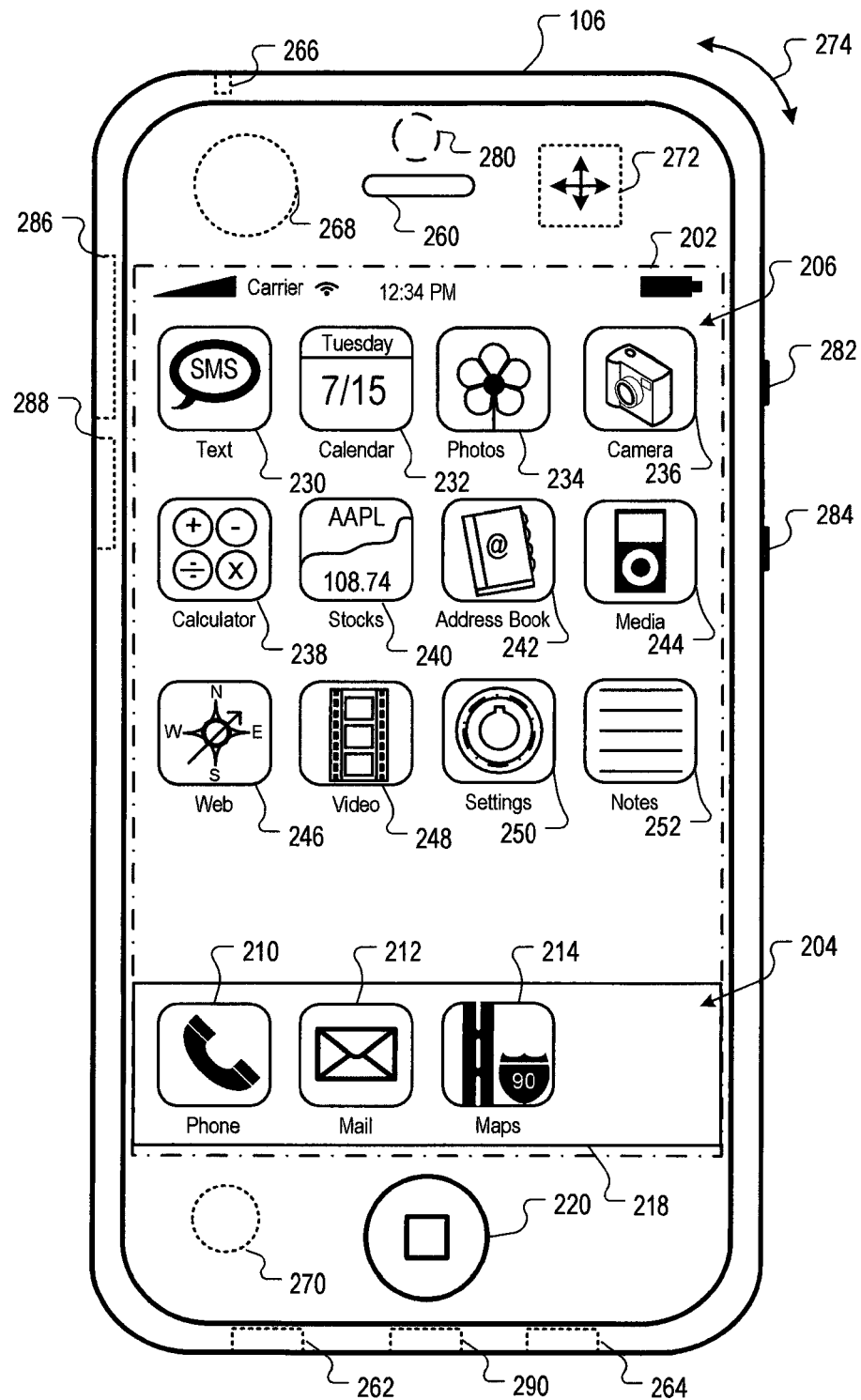
Figure 3:
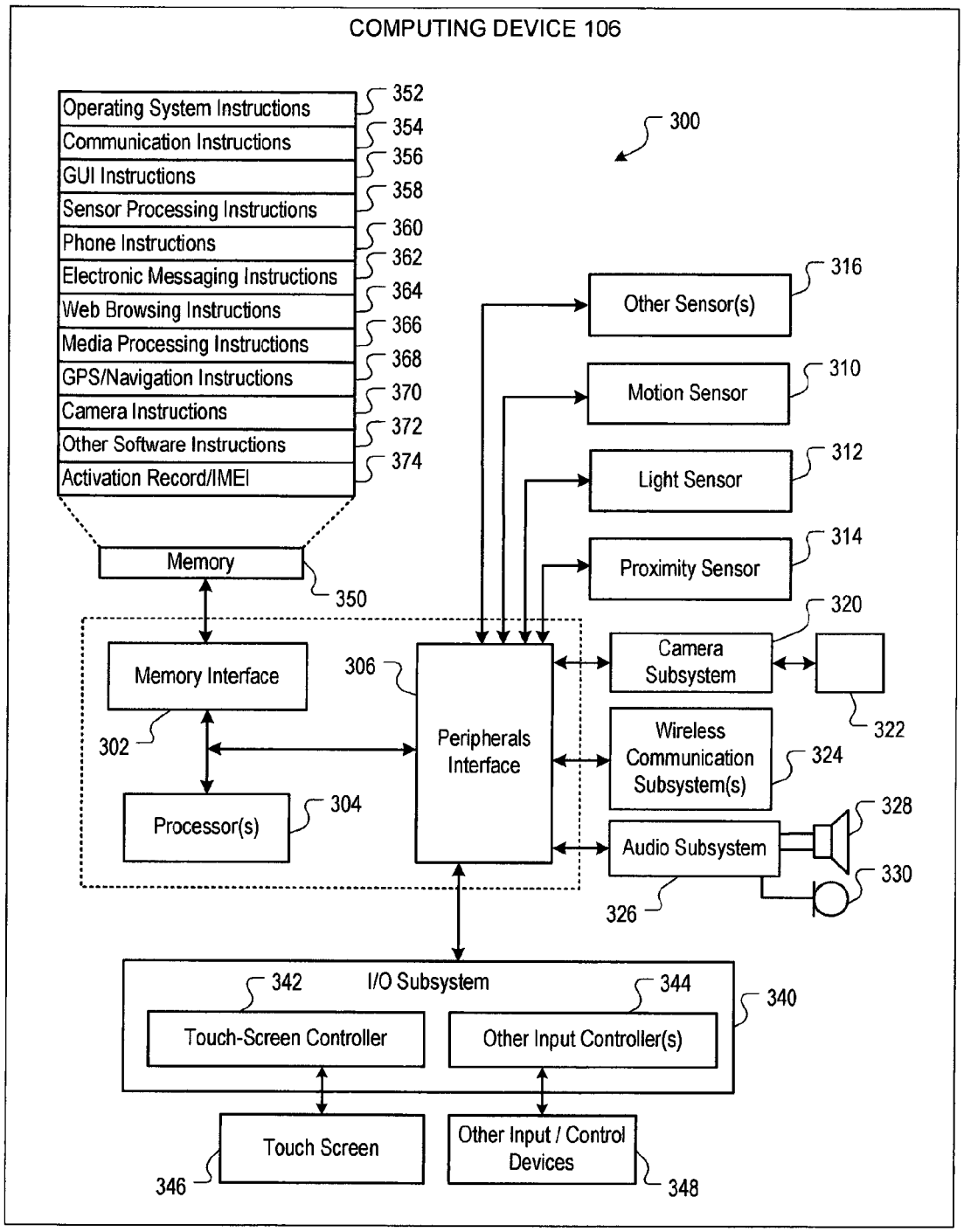
FIG. 3 is a block diagram 300 of an example implementation of a mobile device.
Figure 4:
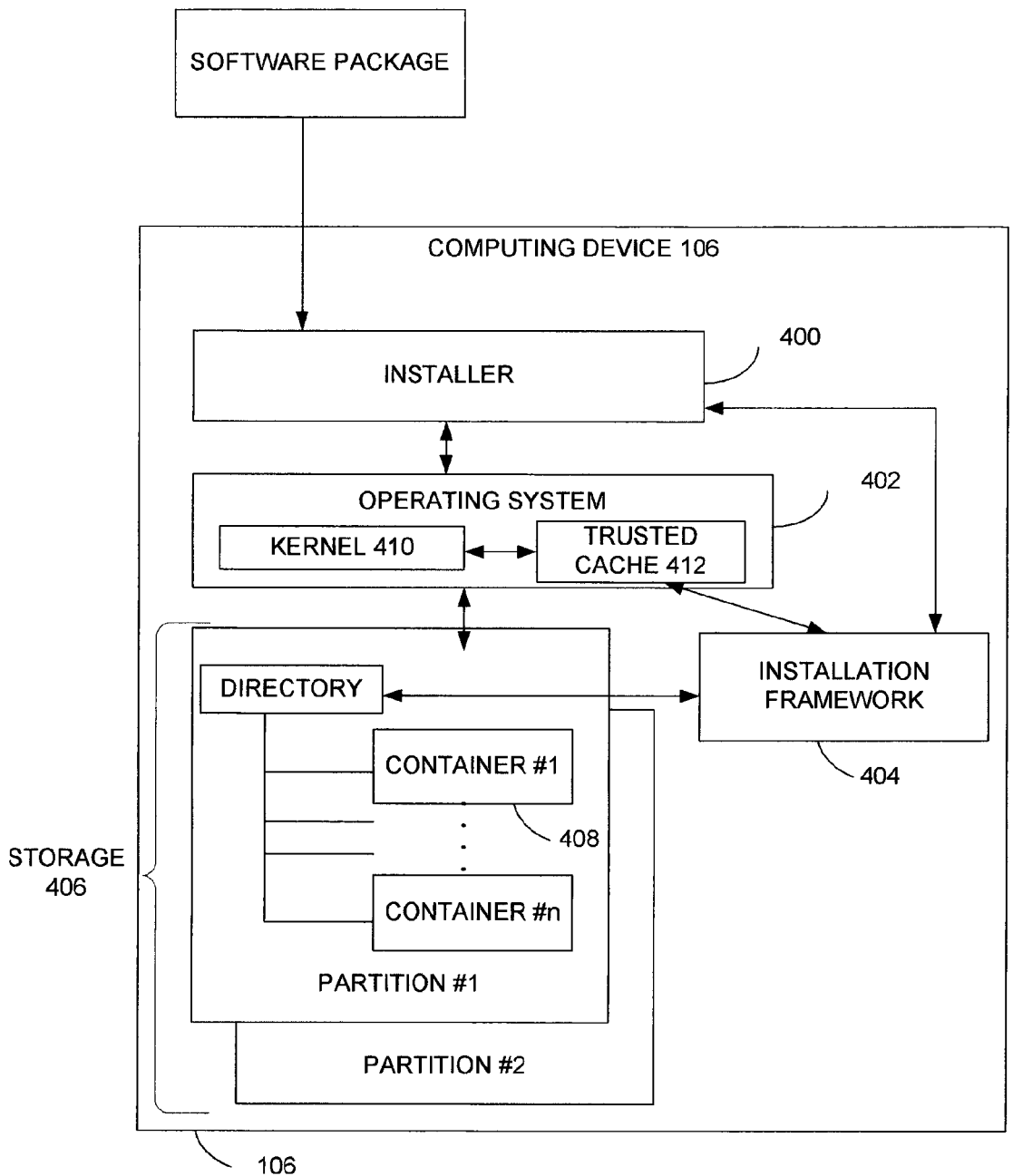
FIG. 4 illustrates a conceptual block diagram of an environment on the computing device 106 that supports secure installation of software.
Figure 5:
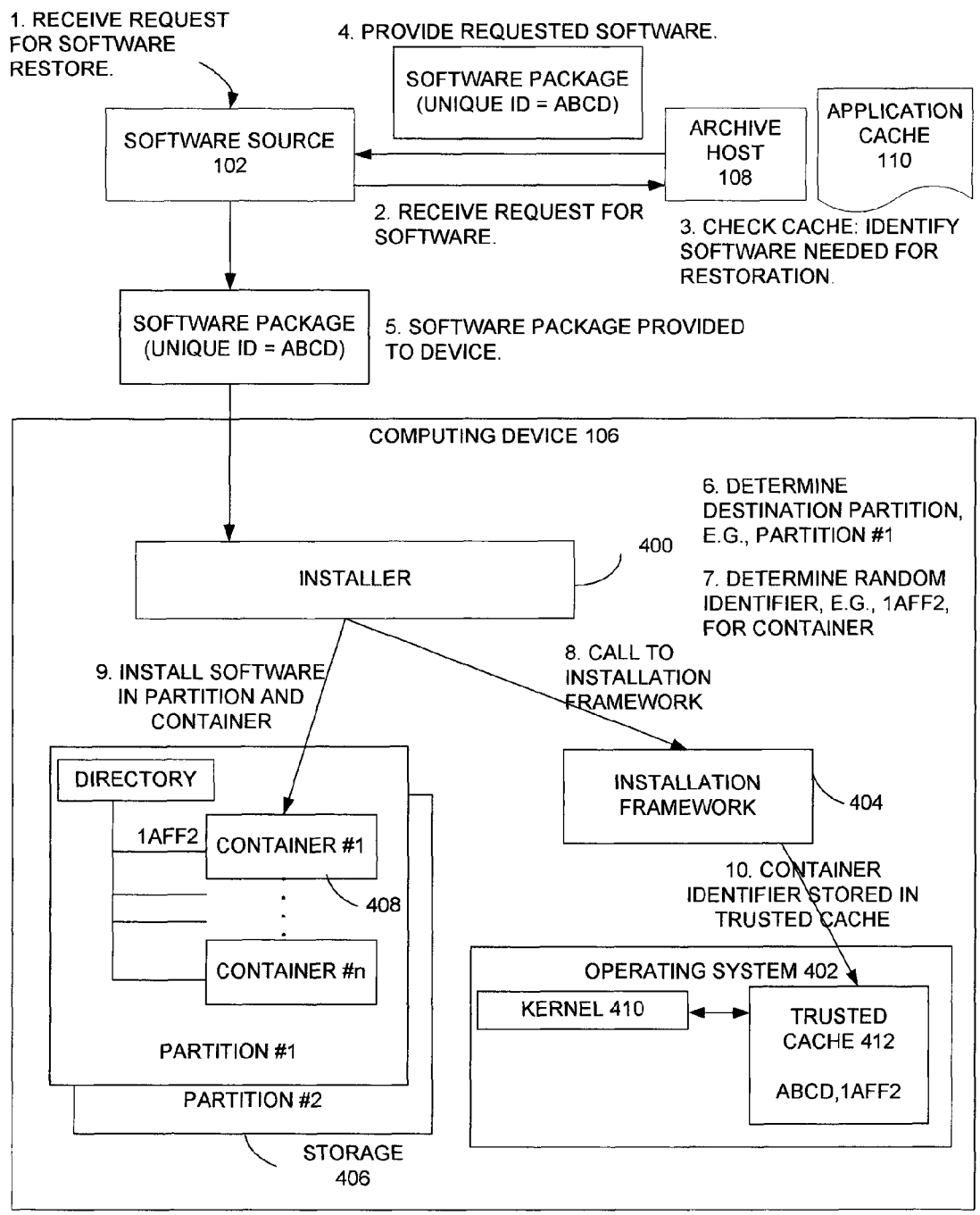
FIG. 5 illustrates an exemplary process for upgrading or synchronizing software on the computing device.
Figure 6:
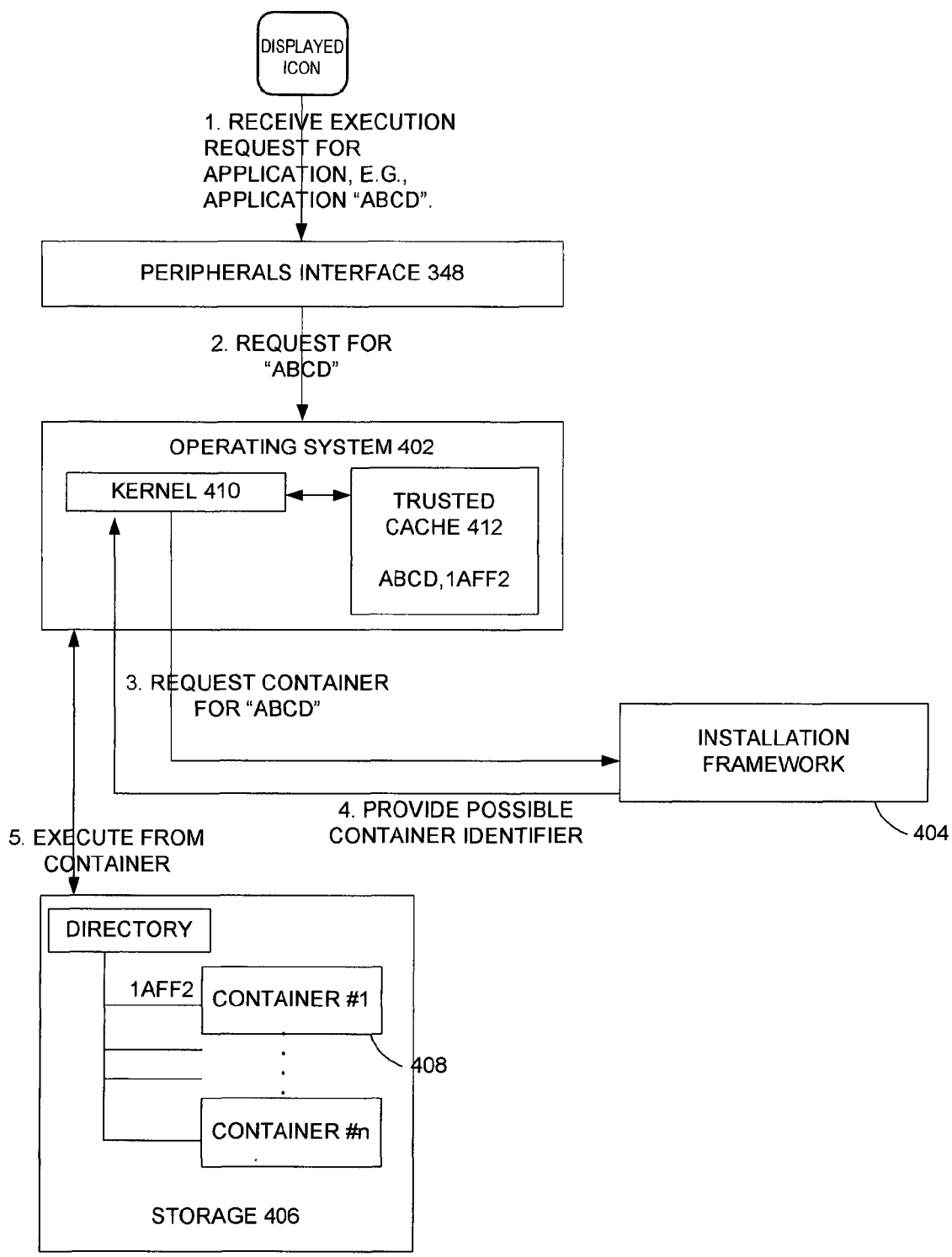
FIG. 6 illustrates an exemplary process for executing securely installed software on the computing device 106.

In order to help explain the embodiments of these and other concepts, FIGS. 1-6 are provided in this description. FIG. 1 shows an example of a computing environment in which the embodiments may be implemented. FIGS. 2A-2B and FIG. 3 illustrate an exemplary mobile device. FIG. 4 illustrates a conceptual block diagram of an environment on the computing device 106 that supports secure installation of software. FIG. 5 illustrates an exemplary process flow for upgrading and synchronizing securely installed applications. And, FIG. 6 illustrates an exemplary process for executing a securely installed application. These figures will now be further described below beginning with reference to FIG. 1.

For purposes of illustration, the present disclosure provides as an example a mobile computing device that is capable of securely installing applications. The mobile computing device may obtain these applications from an online source, such as, Apple's iTunes App Store. However, one skilled in the art will recognize that embodiments of the present invention are not limited to mobile devices.

Referring now to FIG. 1, an example of an environment suitable for practicing various embodiments is provided. As shown, system 100 may comprise a source 102 for the software and/or program code to be installed, a network 104, a set of computing devices 106, an archive host 108, and an application cache 110. These entities and components will now be further described.

Source 102 serves as the source of the software program code to be installed. For example, source 102 can be a website, or service that is accessible to the computing devices 106. In some embodiments, source 102 is an application that runs on the computing device 106 and makes source 102 accessible via network 104.

For example, the source 102 may be a website or service, which allows users of the computing devices 106 to browse and download applications from an online content and media store. Such media stores may include stores, such as Apple's iTunes Store, App Catalog by Palm Inc., Android Market, Windows Marketplace for Mobile by Microsoft, the Ovi store by Nokia, and BlackBerry App World by Research in Motion.

The applications on source 102 may be available to purchase or free of charge, depending on the application. The applications can be downloaded directly to the computing devices 106 as will be further described.

Network 104 provides a communication infrastructure between computing devices 106 and source 102. Network 104 may be any type of network, such as a wide-area network, metropolitan-area network, or local-area network. In addition, network 104 may comprise both wired and wireless networks.

In some embodiments, network 104 may be implemented on the Internet, which is the well-known global network of interconnected computers, enabling users to share information. The components and protocols employed by network 104 are well known to those skilled in the art.

Computing devices 106 may be any computing device used by a user. Computing devices 106 may be mobile computing devices, such as mobile telephones, mobile smart-phones, or some other type of mobile device. Computing devices 106 may be configured to run an operating system that requires some or all of its software and code to have been securely installed. Thus, if software is delivered or installed in an unauthorized state to computing devices 106, the devices may be unable to fully execute the code instructions included in the software because they have not been properly installed.

Computing devices 106 may be any number of different types of computing devices, including desktop computers, laptop computers, handheld computers, personal digital assistant (PDA) devices, mobile telephone, media play device, and the like. For purposes of illustration, various embodiments related to a mobile device are provided. However, one skilled in the art will recognize that the embodiments can be applied to any type of computing device.

Archive host 108 provides a storage location for program code and related data for applications installed on mobile devices 106. In particular, archive host 108 serves as a host that preserves and provides access to software that has been installed on mobile devices 106. For example, when an application has been purchased from source 102 and installed, source 102 may also archive a copy of the application to archive host 108. The archive copy may comprise all the files for an application, such as program code, data, and other documents, or may comprise a portion of the files, such as only the data or documents. Archive host 108 may be implemented on a server using well known components of hardware or software. In some embodiments, the archive copies of applications are stored in the form of the well-known .zip file format. Of course, any type of file format for archives may be employed.

In some embodiments, the archive copy may be packaged in installable form to allow for easy reinstallation or upgrade of the application. The contents of the package may be configured based on various criteria, such as user configuration settings, settings of archive host, settings requested by source 102, etc.

In some embodiments, archive host 108 may employ various security features, such as secured logins, authentication, and encryption in order to protect its information. For example, archive host 108 may restrict access of a mobile device 106 to information corresponding to its device identifier. As another example, an entity may be allowed to access information for only those mobile devices to which it manages or to only those devices having software signed by that entity. Those skilled in the art will recognize that a variety of security policies and features may be employed to protect archive host 108.

Application cache 110 maintains a list or database of applications that are authorized for each of mobile devices 106. For example, application cache 110 may comprise respective lists or mappings indicating various aspects of the configuration of a mobile device, such as an identifier for mobile device 106, applications installed, version information, devices that are related to mobile device 106, and the like. In other words, any type of information that indicates the state and configuration of software or firmware installed on a mobile device 106 may be maintained in cache 110. Those skilled in the art will recognize that application cache 110 may employ various lists, data structures, and databases to maintain this information.

FIG. 2A illustrates an example mobile device 106. The mobile device 106 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 106 includes a touch-sensitive display 202. The touch-sensitive display 202 can be implemented with liquid crystal display (LCD) technology, light emitting polymer display (LPD) technology, or some other display technology. The touch-sensitive display 202 can be sensitive to haptic and/or tactile contact with a user.

In some implementations, the touch-sensitive display 202 can comprise a touch-sensitive display 202. A touch-sensitive display 202 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 106 can display one or more graphical user interfaces on the touch-sensitive display 202 for providing the user access to various system objects and for conveying information to the user. In some implementations, the graphical user interface can include one or more display objects 204, 206. In the example shown, the display objects 204, 206, are graphic representations of system objects. Some examples of system objects include device functions, applications, windows, files, alerts, events, or other identifiable system objects.

Example Mobile Device Functionality

In some implementations, the mobile device 106 can implement multiple device functionalities, such as a telephony device, as indicated by a Phone object 210; an e-mail device, as indicated by the Mail object 212; a map devices, as indicated by the Maps object 214; a Wi-Fi base station device (not shown); and a network video transmission and display device, as indicated by the Web Video object 216. In some implementations, particular display objects 204, e.g., the Phone object 210, the Mail object 212, the Maps object 214, and the Web Video object 216, can be displayed in a menu bar 218. In some implementations, device functionalities can be accessed from a top-level graphical user interface, such as the graphical user interface illustrated in FIG. 2A. Touching one of the objects 210, 212, 214, or 216 can, for example, invoke a corresponding functionality.

In some implementations, the mobile device 106 can implement a network distribution functionality. For example, the functionality can enable the user to take the mobile device 106 and provide access to its associated network while traveling. In particular, the mobile device 106 can extend Internet access (e.g., WiFi) to other wireless devices in the vicinity. For example, mobile device 106 can be configured as a base station for one or more devices. As such, mobile device 106 can grant or deny network access to other wireless devices.

In some implementations, upon invocation of a device functionality, the graphical user interface of the mobile device 106 changes, or is augmented or replaced with another user interface or user interface elements, to facilitate user access to particular functions associated with the corresponding device functionality. For example, in response to a user touching the Phone object 210, the graphical user interface of the touch-sensitive display 202 may present display objects related to various phone functions; likewise, touching of the Mail object 212 may cause the graphical user interface to present display objects related to various e-mail functions; touching the Maps object 214 may cause the graphical user interface to present display objects related to various maps functions; and touching the Web Video object 216 may cause the graphical user interface to present display objects related to various web video functions.

In some implementations, the top-level graphical user interface environment or state of FIG. 2A can be restored by pressing a button 220 located near the bottom of the mobile device 106. In some implementations, each corresponding device functionality may have corresponding "home" display objects displayed on the touch-sensitive display 202, and the graphical user interface environment of FIG. 2A can be restored by pressing the "home" display object.

In some implementations, the top-level graphical user interface can include additional display objects 206, such as a short messaging service (SMS) object 230, a Calendar object 232, a Photos object 234, a Camera object 236, a Calculator object 238, a Stocks object 240, an Address Book object 242, a Media object 244, a Web object 246, a Video object 248, a Settings object 250, and a Notes object (not shown). Touching the SMS display object 230 can, for example, invoke an SMS messaging environment and supporting functionality; likewise, each selection of a display object 232, 234, 236, 238, 240, 242, 244, 246, 248, and 250 can invoke a corresponding object environment and functionality.

Additional and/or different display objects can also be displayed in the graphical user interface of FIG. 2A. For example, if the device 106 is functioning as a base station for other devices, one or more "connection" objects may appear in the graphical user interface to indicate the connection. In some implementations, the display objects 206 can be configured by a user, e.g., a user may specify which display objects 206 are displayed, and/or may download additional applications or other software that provides other functionalities and corresponding display objects.

In some implementations, the mobile device 106 can include one or more input/output (I/O) devices and/or sensor devices. For example, a speaker 260 and a microphone 262 can be included to facilitate voice-enabled functionalities, such as phone and voice mail functions. In some implementations, an up/down button 284 for volume control of the speaker 260 and the microphone 262 can be included. The mobile device 106 can also include an on/off button 282 for a ring indicator of incoming phone calls. In some implementations, a loud speaker 264 can be included to facilitate hands-free voice functionalities, such as speaker phone functions. An audio jack 266 can also be included for use of headphones and/or a microphone.

In some implementations, a proximity sensor 268 can be included to facilitate the detection of the user positioning the mobile device 106 proximate to the user's ear and, in response, to disengage the touch-sensitive display 202 to prevent accidental function invocations. In some implementations, the touch-sensitive display 202 can be turned off to conserve additional power when the mobile device 106 is proximate to the user's ear.

Other sensors can also be used. For example, in some implementations, an ambient light sensor 270 can be utilized to facilitate adjusting the brightness of the touch-sensitive display 202. In some implementations, an accelerometer 272 can be utilized to detect movement of the mobile device 106, as indicated by the directional arrow 274. Accordingly, display objects and/or media can be presented according to a detected orientation, e.g., portrait or landscape. In some implementations, the mobile device 106 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 106 or provided as a separate device that can be coupled to the mobile device 106 through an interface (e.g., port device 290) to provide access to location-based services.

In some implementations, a port device 290, e.g., a Universal Serial Bus (USB) port, or a docking port, or some other wired port connection, can be included. The port device 290 can, for example, be utilized to establish a wired connection to other computing devices, such as other communication devices 106, network access devices, a personal computer, a printer, a display screen, or other processing devices capable of receiving and/or transmitting data. In some implementations, the port device 290 allows the mobile device 106 to synchronize with a host device using one or more protocols, such as, for example, the TCP/IP, HTTP, UDP and any other known protocol.

The mobile device 106 can also include a camera lens and sensor 280. In some implementations, the camera lens and sensor 280 can be located on the back surface of the mobile device 106. The camera can capture still images and/or video.

The mobile device 106 can also include one or more wireless communication subsystems, such as an 802.11b/g communication device 286, and/or a Bluetooth™ communication device 288. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

FIG. 2B illustrates another example of configurable top-level graphical user interface of device 106. The device 106 can be configured to display a different set of display objects.

In some implementations, each of one or more system objects of device 106 has a set of system object attributes associated with it; and one of the attributes determines whether a display object for the system object will be rendered in the top-level graphical user interface. This attribute can be set by the system automatically, or by a user through certain programs or system functionalities as described below. FIG. 2B shows an example of how the Notes object 252 (not shown in FIG. 2A) is added to and the Web Video object 216 is removed from the top graphical user interface of device 106 (e.g. such as when the attributes of the Notes system object and the Web Video system object are modified).

Example Mobile Device Architecture

FIG. 3 is a block diagram 300 of an example implementation of a mobile device 106. As shown, the mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 2A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the mobile device may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumbwheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device on or off. The user may be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device may be implemented in hardware and/or in software, including in one or more signal processing and/or application specific integrated circuits.

FIG. 4 illustrates a conceptual block diagram of an environment on the computing device 106 that supports secure installation of software. As shown, in order to implement secure installation of software, the computing device 106 may comprise an installer 400, an operating system 402, an installation framework 404, storage 406, one or more containers 408 arranged in a directory structure. These components will now be further described.

Installer 400 is a program or process that installs files, such as applications, drivers, or other software, on computing device 106. In some embodiments, installer 400 is configured to read and analyze the contents of a software package to be installed, such as a software package from source 102.

A software package from source 102 may have a specific format and information that is used by installer 400. In particular, a software package may include the software's full name, a unique identifier for the software, a description of its purpose, version number, vendor, checksum, and a list of dependencies necessary for the software to run properly. Upon installation, installer 400 may also store metadata about the software.

In addition, the installer 400 may be interfaced based on a predetermined application programming interface (API). In one embodiment, the API comprises functions to install an application, uninstall an application, archive an application, and list installed applications. The API can also provide functions that instruct installer 400 to verify application installation and access restrictions at run time. In some embodiments, the API for the installer 400 may provide primitives for these functions via a trusted portion of the operating system 402, such as the kernel 410.

Operating system 402 generally serves as an interface between hardware and the user. In particular, operating system 402 may be responsible for the management and coordination of activities and the sharing of the resources of the computing device 106. Operating system 402 primarily acts as a host for applications, and thus, includes instructions that handle the details of the operation of the hardware of the computing device 106.

In addition, operating system 402 may offer a number of services to application programs and users. The applications running on computing device 106 may access these services through APIs or system calls. For example, by calling an API function, an application can request a service from the operating system 402, pass parameters, and receive the results of the operation.

In some embodiments, operating system 402 may be like operating system 352, shown in FIG. 3. Accordingly, operating system 402 may be an operating system, such as Darwin, RTXC, LINUX, UNIX, OS X, WINDOWS, or an embedded operating system such as VxWorks.

Kernel 410 is the central trusted component of operating system 402. The functions of kernel 410 responsibilities include managing the resources, such as the resources shown in FIGS. 2A-2B and FIG. 3. In particular, kernel 410 provides access to resources, such as the memory 350, processor(s) 304, and I/O subsystems 340 of computing device 106. In general, kernel 410 may employ API system calls and inter-process communications to perform its function.

Trusted cache 412 is a temporary storage area where frequently accessed data, such as randomly assigned identifiers for containers 408, can be stored for rapid access. For example, cache 412 may be implemented in memory 350 to of computing device 106. Furthermore, trusted cache 412 may be maintained in a trusted space of memory 350 in order to secure its information. In some embodiments, access to trusted cache 412 may be limited to certain components, such as kernel 410.

Installation framework 404 is a library file that controls how applications are securely installed on the computing device 106 and the management of the securely installed applications. In some embodiments, the installation framework 404 restricts where and how applications can be installed on the computing device 106. For example, the installation framework 404 may contain supporting programs, libraries, or references to other files.

Storage 406 may be any data storage device, such as a hard disk, memory, optical disk, etc. for computing device 106. In some embodiments, information is stored in storage 406 based on a known file system and directory structure. Such file systems and directory structures are known to those skilled in the art.

As shown, storage 406 may comprise multiple partitions, such as partitions #1 and #2 depicted in FIG. 4. Partitioning of storage 406 allows for the protection and isolation of the files associated with the applications. For example, a first version of the application may be stored in partition #1, but a second version or upgrade of the application may then be stored in partition #2. This also allows for securely installed applications to continue to be installed in dynamic containers, like containers 408, which are self-contained. Such dynamic containers are further described below.

One skilled in the art will recognize that device 106 may comprise any number of partitions of various sizes and configurations. Furthermore, the use of partitions in storage 406 allows applications to be upgraded independently of the upgrade processes used elsewhere on device 106. For example, applications securely installed on device 106 may be upgraded without having to use the upgrade processes of operating system 402.

Within each partition, the various embodiments may employ various file systems and directories. In some embodiments, the file systems employ directories having randomly assigned identifiers or names, which are dynamic containers for an application. In particular, these random identifiers provide a level of indirection that helps allow the installation framework 404 control the installation and execution of software within its container. The random identifiers are unknown to the application itself and known only to the installation framework 404. This mechanism provides the operating system 402 a point of control that ensures the behavior of an application's installation and execution.

Containers 408 refer to any collection of resources that are used store the program code of a software application and used by the application running on computing device 106, such as disk space on storage 406 and/or memory space in memory 350. In some embodiments, containers 408 may comprise a directory that refers to a specific area of storage 406 on the device 106. Data specific to the software application including code storage, documents, preferences, and other libraries are stored and restricted to the containers 408.

In order to enhance security, containers 408 can employ randomly assigned identifiers, such as random directory names, that are unknown to the application. One advantage, among others, is that the application is prevented from becoming a security risk since the application does not directly control its resources or directory space. As noted, the installer 400 may use randomly assigned identifiers for the containers 408. The random identifiers may be based on various functions, such as a hash function of information provided in the application's package, some other type of cryptographic function, and the like. In addition, the random identifiers for the containers 408 may be based on various unique attributes of the software. For example, unique application identifiers in the form of com.domain.email may be used in determining the random identifier for the container 408. In some embodiments, the installer 400 stores this information only in trusted cache 412.

During execution, a software application may also be restricted in various ways to its respective partition and containers 408. For example, containers 408 may comprise a set of resource limits imposed on programs by kernel 410, such as 110 bandwidth caps, disk quotas, network access restrictions, and as noted above a restricted directory namespace known only to the installation framework 404.

FIG. 5 illustrates an exemplary process for securely installing software on the computing device 106. As shown, first, computing device 106 may receive a request to upgrade or synchronize an application. For example, a user of computing device 106 may access source 102 and select one or more applications to synchronize them or to check if upgrades are available. The various applications may be identified based on information stored on the device.

Second, source 102 may forward the request to archive host 108. Source 102 may provide various types of information in the request, such as one or more identifiers for the application, the entity that signed the application, etc.

Third, archive host 108 checks application cache 110 to identify the software that is the subject of the request. For example, archive host 108 may check whether an application has an upgrade that is now available. As another example, archive host 108 may check whether an application has been previously authorized for the device and for multiple installations on other authorized devices of a user. This authorization may depend on authentication of the user and/or other criteria.

Fourth, archive host 108 provides a package for the selected software to be installed on the computing device 106. As noted, the package may include the software's full name, a unique identifier for the software, a description of its purpose, version number, vendor, checksum, and a list of dependencies necessary for the software to run properly. The package provided from archive host 108 may comprise different types of files. For example, the package may comprise all the files needed to install the application. However, the package may comprise just data used by the application or documents used by the application. The contents of the package may vary depending on the application, the nature of the request, settings of archive host 108, etc.

In the example shown in FIG. 5, the requested application has a unique identifier of "ABCD." Upon receiving this package, operating system 402 may execute installer 400 as a running process to perform the installation of the requested software.

Fifth, source 102 provides the package to the computing device 106. In some embodiments, source 102 may perform additional activities related to the package. For example, source 102 may perform various integrity checks, formatting, and/or add additional data or files to the package.

Sixth, installer 400 determines a destination partition, e.g., partition #1, and container 408 for the application. For example, as shown, installer 400 may select partition #1 as the destination partition.

Seventh, installer 400 may randomly assign an identifier or name for a directory that is to be used as container 408 for the application, e.g., application ABCD. For example, installer 400 may perform various cryptographic functions to determine/generate a random identifier for container 408. Such cryptographic functions are known to those skilled in the art. In some embodiments, installer 400 may employ a hashing function that is based on information from the package in order to determine/generate the random identifier for container 408. In addition, installer 400 may utilize various arbitrary attributes of the software to determine the random identifier. In the example shown in FIG. 5, installer 400 has generated "1AFF2" as the random identifier for the container 408.

Eighth, installer 400 makes a call to installation framework 404. In response, installation framework 404 may record the random identifier and associate it with the application. In addition, installation framework 404 may determine various constraints, such as I/O limits, storage space, etc., for the requested application in container 408.

Ninth, installer 400 and/or installation framework 404 installs the program code, etc. in its partition and container 408. In some embodiments, each application is given one container 408. For example, as shown, installer 400 may call installation framework 404 and install compiled code in partition #1 of storage 406.

Tenth, the identifier for container 408 is stored in trusted cache 412 for later use by operating system 402, kernel 410 and/or installation framework 404. For example, installation framework 404 may record an entry in trusted cache 412 that correlates application "ABCD" with container identifier "1AFF2" for container 408 and for partition #1 in storage 406. Of course, the operating system 402, kernel 410 or installation framework 404 may utilize other bind processes to correlate the randomly assigned identifier with the application being installed.

In addition to the process described above, when a request to upgrade or synchronize the software is received, computing device 106 can also check a digital signature of the software or software package to verify its authenticity and/or authorization. If the software is verified as being signed by a trusted authority, installer 400 and/or installation framework 404 may also permit installation of the computing device 106 as additional or alternative criteria for allowing installation.

FIG. 6 illustrates an exemplary process for executing securely installed software on the computing device 106. In general, the installation framework 404 manages the launching and execution of applications being executed on the computing device 106. In particular, the installation framework 404 provides a mechanism by which the operating system 402 identifies and locates the container 408 for an application.

First, computing device 106 receives a request to launch or execute an application that has been securely installed on computing device 106. For example, a user of computing device 106 may select an application installed on the computing device. In the example shown in FIG. 6, application "ABCD" has been selected by the user using a peripheral, such as a touch screen, etc. This information may then be passed via peripherals interface 306 to operating system 402.

Second, operating system 402 services this request. For example, operating system 402 may instruct kernel 410 to execute the requested application, e.g., application "ABCD." Because this application has been securely installed, the location of container 408 is unknown or initially beyond the control of the application.

Accordingly, third, kernel 410 makes a call to installation framework 404 requesting the identifier for container 408 for application "ABCD." Fourth, installation framework 404 may then perform a search for the container 408 for the requested application and then responds with the identifier for container 408, e.g., "1AFF2."

For example, kernel 410 may perform a comparison of this unique identifier with the information stored in trusted cache 412. For example, kernel 410 may perform a text comparison to determine whether the identifier matches an entry that is stored in trusted cache 412.

If the information does not match what is stored in trusted cache 412, then operating system 402 may deny the application and/or prompt the user for a response. For example, the operating system 402 may provide a warning message that the application could not be found by installation framework 404.

If the information matches what is stored in trusted cache 412, then, fifth, kernel 410 continues its service of the application. In particular, the application is allowed to execute on computing device 106 within the constraints of its container 408.

In addition to the process described above, when a request to execute the software is received, computing device 106 can also check a digital signature of the software to verify its authenticity and/or authorization. If the software is verified as being signed by a trusted authority, installation framework 404 may use this verification as additional or alternative criteria for allowing execution.

It is pertinent to point out that the specific structures and sequences described above may be implemented/performed with alternative structures and sequences. Therefore, the teachings of the above description should not be construed as being limited to the specific structures and/or sequences described above.

Those of skill may recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it may be understood that various omissions, substitutions, and changes in the form and details of a device or process illustrated may be made by those skilled in the art without departing from the spirit of the invention. As may be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method for enabling synchronization of applications installed across different devices, the method comprising:
    at a server device:
        receiving, from a first device, authentication information associated with a first version of an application that is installed on the first device;
        archiving the authentication information;
        receiving, from a second device, a first request to install the first version of the application on the second device;
        in response to the first request, verifying whether the first device and the second device are associated with a same entity; and
        in response to verifying that the first device and the second device are associated with the same entity:
            providing, to the second device, the authentication information, wherein the authentication information enables the first version of the application to be executed on the second device.

2. The method of claim 1, further comprising:
    receiving, from the first device, an indication that a second version of the application has been installed on the first device;
    receiving, from the first device, a second request for the authentication information; and
    providing, to the first device and in response to the second request, the authentication information, wherein the authentication information enables the second version of the application to be executed on the first device.

3. The method of claim 2, wherein the second version of the application is an upgrade to the first version of the application.

4. The method of claim 2, wherein the second version of the application is a restoration of the first version of the application.

5. The method of claim 1, further comprising:
    providing, to one or more of the first device and the second device, first installation information that corresponds to the first version of the application.

6. The method of claim 1, wherein each of the first device and the second device is configured to store the first version of the application in a respective local storage device partition that is associated with a unique identifier, and the unique identifier is not known to the first version of the application.

7. The method of claim 6, wherein each of the first device and the second device is configured to implement an installation component that manages the unique identifier and has access to the respective local storage device partition.

8. A non-transitory computer readable storage medium configured to store instructions that, when executed by a processor included in a server computing device, cause the server computing device to synchronize applications installed across different devices, by carrying out steps that include:
    receiving, from a first device, authentication information associated with a first version of an application that is installed on the first device;
    archiving the authentication information;
    receiving, from a second device, a first request to install the first version of the application on the second device;
    in response to the first request, verifying whether the first device and the second device are associated with a same entity; and
    in response to verifying that the first device and the second device are associated with the same entity:
        providing, to the second device, the authentication information, wherein the authentication information enables the first version of the application to be executed on the second device.

9. The non-transitory computer readable storage medium of claim 8, wherein the steps further include:
    receiving, from the first device, an indication that a second version of the application has been installed on the first device;
    receiving, from the first device, a second request for the authentication information; and
    providing, to the first device and in response to the second request, the authentication information, wherein the authentication information enables the second version of the application to be executed on the first device.

10. The non-transitory computer readable storage medium of claim 9, wherein the second version of the application is an upgrade to the first version of the application.

11. The non-transitory computer readable storage medium of claim 9, wherein the second version of the application is a restoration of the first version of the application.

12. The non-transitory computer readable storage medium of claim 8, wherein the steps further include:
    providing, to one or more of the first device and the second device, first installation information that corresponds to the first version of the application.

13. The non-transitory computer readable storage medium of claim 8, wherein each of the first device and the second device is configured to store the first version of the application in a respective local storage device partition that is associated with a unique identifier, and the unique identifier is not known to the first version of the application.

14. The non-transitory computer readable storage medium of claim 13, wherein each of the first device and the second device is configured to implement an installation component that manages the unique identifier and has access to the respective local storage device partition.

15. A system configured to synchronize applications installed across different devices, the system comprising:
    a first device;
    a second device; and
    a server device, configured to:
        receive, from the first device, authentication information associated with a first version of an application that is installed on the first device;
        archive the authentication information;
        receive, from the second device, a first request to install the first version of the application on the second device;
        in response to the first request, verify whether the first device and the second device are associated with a same entity; and in response to verifying that the first device and the second device are associated with the same entity:
    provide, to the second device, the authentication information, wherein the authentication information enables the first version of the application to be executed on the second device.

16. The system of claim 15, wherein the server device is further configured to:
    receive, from the first device, an indication that a second version of the application has been installed on the first device;
    receive, from the first device, a second request for the authentication information; and
    provide, to the first device and in response to the second request, the authentication information, wherein the authentication information enables the second version of the application to be executed on the first device.

17. The system of claim 16, wherein the second version of the application is an upgrade to the first version of the application.

18. The system of claim 16, wherein the second version of the application is a restoration of the first version of the application.

19. The system of claim 15, wherein the server device is further configured to:
    provide, to one or more of the first device and the second device, first installation information that corresponds to the first version of the application.

20. The system of claim 19, wherein each of the first device and the second device is configured to store the first version of the application in a respective local storage device partition that is associated with a unique identifier, and the unique identifier is not known to the first version of the application.

* * * * *